(12) United States Patent
Kramer

(10) Patent No.: US 11,467,940 B1
(45) Date of Patent: Oct. 11, 2022

(54) ANOMALY DETECTOR FOR A GROUP OF HOSTS

(71) Applicant: Amazon Technologies, Inc., Seattle, WA (US)

(72) Inventor: Michael Kramer, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 595 days.

(21) Appl. No.: 16/571,836

(22) Filed: Sep. 16, 2019

(51) Int. Cl.
*G06F 11/00* (2006.01)
*G06F 11/34* (2006.01)
(Continued)

(52) U.S. Cl.
CPC ............ *G06F 11/34* (2013.01); *G06F 9/4806* (2013.01); *G06F 11/0709* (2013.01);
(Continued)

(58) Field of Classification Search
CPC ............ G06F 11/3452; G06F 11/3006; G06F 11/3065; G06F 11/34; G06F 11/0709
See application file for complete search history.

(56) References Cited

U.S. PATENT DOCUMENTS

2016/0210556 A1\* 7/2016 Ben Simhon .......... G06N 20/00
2017/0102694 A1\* 4/2017 Enver ............. G05B 19/41875
(Continued)

OTHER PUBLICATIONS

BetterExplained, "An Interactive Guide to the Fourier Transform," 2019, retrieved from https://betterexplained.com/articles/an-interactive-guide-to-the-fourier-transform/, pp. 1-27.
(Continued)

*Primary Examiner* — Charles Ehne
(74) *Attorney, Agent, or Firm* — Nicholson De Vos Webster & Elliott LLP

(57) ABSTRACT

Techniques for anomaly detection within a group of hosts are described. As one example, a computer-implemented method includes performing a single, distributed task with a plurality of hosts, sending, by each host of the plurality of hosts, processing utilization data for a period of time to an anomaly detector, generating a Fourier component vector for each host that comprises a Fourier component value in each element from the processing utilization data of that host with the anomaly detector, generating a mean value vector that comprises a mean value for each element position of the Fourier component vectors in a respective element position of the mean value vector with the anomaly detector, generating a standard deviation vector that comprises a standard deviation for each element position of the Fourier component vectors in a respective element position of the standard deviation vector with the anomaly detector, generating a host standard deviation vector for each host that comprises a deviation of each element of the Fourier component vector of that host from a respective element of the mean value vector by a number of standard deviations read from a respective element of the standard deviation vector with the anomaly detector, determining, with the anomaly detector, an anomalous host of the plurality of hosts from the host standard deviation vectors when at least one threshold is exceeded in the host standard deviation vectors, and causing an indication for the anomalous host to be sent by the anomaly detector.

20 Claims, 12 Drawing Sheets

(51) Int. Cl.
    *G06F 11/30*     (2006.01)
    *G06F 9/48*     (2006.01)
    *G06F 17/16*     (2006.01)
    *G06F 17/18*     (2006.01)
    *G06F 11/07*     (2006.01)

(52) U.S. Cl.
    CPC .......... *G06F 11/3006* (2013.01); *G06F 17/16* (2013.01); *G06F 17/18* (2013.01)

(56) References Cited

U.S. PATENT DOCUMENTS

2020/0264965 A1\*   8/2020   Harutyunyan .......... H04L 41/40
2020/0341833 A1\*   10/2020   Poghosyan ........... G06F 11/301

OTHER PUBLICATIONS

Wikipedia, "Fourier Transform," 2019, retrieved from https://en.wikipedia.org/wiki/Fourier_transform, pp. 1-29.

\* cited by examiner

| ATTRIBUTE DATA 118 | | | |
|---|---|---|---|
| TIME 202 | PROCESSING % UTILIZATION: 5-MIN AVERAGE 204 | | |
| | HOST 1 206 | HOST 2 208 | HOST 3 210 |
| YEAR-MONTH-DAYT07:00:00.000 | 3.7125 | 3.8375 | 3.550711782 |
| YEAR-MONTH-DAYT07:05:00.000 | 3.804166667 | 3.716666667 | 3.412285952 |
| YEAR-MONTH-DAYT07:10:00.000 | 3.579166667 | 3.929166667 | 3.607772862 |
| YEAR-MONTH-DAYT07:15:00.000 | 3.4 | 3.566666667 | 3.228871563 |
| YEAR-MONTH-DAYT07:20:00.000 | 3.487095953 | 3.454166667 | 3.100613276 |
| YEAR-MONTH-DAYT07:25:00.000 | 3.625 | 3.504166667 | 3.135527998 |
| YEAR-MONTH-DAYT07:30:00.000 | 3.266666667 | 3.466666667 | 3.083644445 |
| YEAR-MONTH-DAYT07:35:00.000 | 3.308333333 | 3.795833333 | 3.399156663 |
| YEAR-MONTH-DAYT07:40:00.000 | 3.178011253 | 3.745833333 | 3.336257311 |
| YEAR-MONTH-DAYT07:45:00.000 | 3.175 | 3.366666667 | 2.944970944 |
| YEAR-MONTH-DAYT07:50:00.000 | 3.3125 | 3.254166667 | 2.821153965 |
| YEAR-MONTH-DAYT07:55:00.000 | 2.995833333 | 3.220833333 | 2.777327917 |
| YEAR-MONTH-DAYT08:00:00.000 | 3.175 | 3.345833333 | 2.89267944 |
| YEAR-MONTH-DAYT08:05:00.000 | 3.266666667 | 3.204166667 | 2.7422269 |
| YEAR-MONTH-DAYT08:10:00.000 | 2.954166667 | 3.1875 | 2.71765369 |
| YEAR-MONTH-DAYT08:15:00.000 | 2.908333333 | 3.020833333 | 2.543974858 |
| YEAR-MONTH-DAYT08:20:00.000 | 2.908333333 | 2.941666667 | 2.458703754 |
| YEAR-MONTH-DAYT08:25:00.000 | 3.129166667 | 3.0625 | 2.574351996 |
| YEAR-MONTH-DAYT08:30:00.000 | 2.8625 | 2.979166667 | 2.48676279 |
| YEAR-MONTH-DAYT08:35:00.000 | 2.954166667 | 3.229166667 | 2.733444236 |
| YEAR-MONTH-DAYT08:40:00.000 | 2.775 | 2.970833333 | 2.472735984 |
| YEAR-MONTH-DAYT08:45:00.000 | 2.775 | 2.8625 | 2.362975889 |
| YEAR-MONTH-DAYT08:50:00.000 | 2.995833333 | 2.8375 | 2.3375 |
| YEAR-MONTH-DAYT08:55:00.000 | 2.729166667 | 3 | 2.500475889 |
| YEAR-MONTH-DAYT09:00:00.000 | 2.908333333 | 3.0375 | 2.539402651 |
| YEAR-MONTH-DAYT09:05:00.000 | 3.0875 | 3.025 | 2.529277569 |
| YEAR-MONTH-DAYT09:10:00.000 | 2.769672131 | 3.025 | 2.532596123 |
| YEAR-MONTH-DAYT09:15:00.000 | 3.0875 | 2.866666667 | 2.378518663 |
| YEAR-MONTH-DAYT09:20:00.000 | 2.775 | 2.85 | 2.367037087 |
| YEAR-MONTH-DAYT09:25:00.000 | 2.954166667 | 2.945833333 | 2.468974858 |
| YEAR-MONTH-DAYT09:30:00.000 | 2.729166667 | 2.908333333 | 2.438487023 |
| YEAR-MONTH-DAYT09:35:00.000 | 2.8625 | 3.1625 | 2.700560234 |
| YEAR-MONTH-DAYT09:40:00.000 | 2.729166667 | 3.0125 | 2.559346106 |
| YEAR-MONTH-DAYT09:45:00.000 | 2.775 | 2.920811336 | 2.47730592 |
| YEAR-MONTH-DAYT09:50:00.000 | 2.95 | 2.974780031 | 2.54176733 |
| YEAR-MONTH-DAYT09:55:00.000 | 2.820833333 | 3.041666667 | 2.619970944 |
| YEAR-MONTH-DAYT10:00:00.000 | 2.95 | 3.108333333 | 2.698757311 |
| YEAR-MONTH-DAYT10:05:00.000 | 3.134363712 | 3.073962675 | 2.677286005 |

FIG. 2

TRANSFORM DATA 120

| FT COMPONENT | HOST 1 AMPLITUDE | HOST 1 PHASE (DEGREES) | HOST 2 AMPLITUDE | HOST 2 PHASE (DEGREES) | HOST 3 AMPLITUDE | HOST 3 PHASE (DEGREES) | MEAN AMPLITUDE | AMPLITUDE STANDARD DEVIATION | MEAN PHASE | PHASE STANDARD DEVIATION |
|---|---|---|---|---|---|---|---|---|---|---|
| 0 | 14.595 | 0.000 | 15.448 | 0.000 | 15.078 | 0.000 | 15.040 | 0.428 | 0.000 | 0.000 |
| 1 | 3.361 | 49.272 | 3.177 | 49.045 | 3.406 | 49.060 | 3.315 | 0.121 | 49.126 | 0.127 |
| 2 | 1.573 | 36.235 | 1.538 | 36.287 | 2.111 | 35.740 | 1.741 | 0.321 | 36.087 | 0.302 |
| 3 | 0.380 | -52.401 | 0.389 | -64.286 | 0.352 | -57.700 | 0.347 | 0.036 | -58.129 | 5.954 |

TRANSFORM DATA 120

| FT COMPONENT | HOST 1 (STANDARD DEVIATIONS) AMPLITUDE | HOST 1 (STANDARD DEVIATIONS) PHASE (DEGREES) | HOST 2 (STANDARD DEVIATIONS) AMPLITUDE | HOST 2 (STANDARD DEVIATIONS) PHASE (DEGREES) | HOST 3 (STANDARD DEVIATIONS) AMPLITUDE | HOST 3 (STANDARD DEVIATIONS) PHASE (DEGREES) |
|---|---|---|---|---|---|---|
| 0 | -1.041 | 0.000 | 0.953 | 0.000 | 0.088 | 0.000 |
| 1 | 0.382 | 1.153 | -1.135 | -0.635 | 0.753 | -0.517 |
| 2 | -0.522 | 0.489 | -0.631 | 0.661 | 1.153 | -1.150 |
| 3 | 0.922 | 0.962 | -1.063 | -1.034 | 0.141 | 0.072 |

TRANSFORM DATA 120

| FT COMPONENT | HOST 1 AMPLITUDE | HOST 1 PHASE (DEGREES) | HOST 2 AMPLITUDE | HOST 2 PHASE (DEGREES) | HOST 3 AMPLITUDE | HOST 3 PHASE (DEGREES) | MEAN AMPLITUDE | STANDARD DEVIATION AMPLITUDE | MEAN PHASE | STANDARD DEVIATION PHASE |
|---|---|---|---|---|---|---|---|---|---|---|
| 0 | 14.595 | 0.000 | 15.448 | 0.000 | 15.078 | 0.000 | 15.040 | 0.428 | 0.000 | 0.000 |
| 1 | 3.361 | 49.272 | 3.177 | 49.045 | 3.406 | 49.060 | 3.315 | 0.121 | 49.126 | 0.127 |
| 2 | 1.573 | 36.235 | 1.538 | 36.287 | 2.111 | 35.740 | 1.556 | 0.025 | 36.087 | 0.302 |
| 3 | 0.380 | -52.401 | 0.309 | -64.286 | 0.352 | -57.700 | 0.347 | 0.036 | -58.129 | 5.954 |

FIG. 3C

TRANSFORM DATA 120

| FT COMPONENT | HOST 1 (STANDARD DEVIATIONS) AMPLITUDE | HOST 1 (STANDARD DEVIATIONS) PHASE (DEGREES) | HOST 2 (STANDARD DEVIATIONS) AMPLITUDE | HOST 2 (STANDARD DEVIATIONS) PHASE (DEGREES) | HOST 3 (STANDARD DEVIATIONS) AMPLITUDE | HOST 3 (STANDARD DEVIATIONS) PHASE (DEGREES) |
|---|---|---|---|---|---|---|
| 0 | -1.041 | 0.000 | 0.953 | 0.000 | 0.088 | 0.000 |
| 1 | 0.382 | 1.153 | -1.135 | -0.635 | 0.753 | -0.517 |
| 2 | 0.707 | 0.489 | -0.707 | 0.661 | 22.446 | -1.150 |
| 3 | 0.922 | 0.962 | -1.063 | -1.034 | 0.141 | 0.072 |

FIG. 3D

ANOMALY DETECTOR FOR A GROUP OF HOSTS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which:

FIG. 2 is a diagram illustrating attribute data according to some embodiments.

FIGS. 3A-3D are diagrams illustrating transform data according to some embodiments.

DETAILED DESCRIPTION

Figure 1:
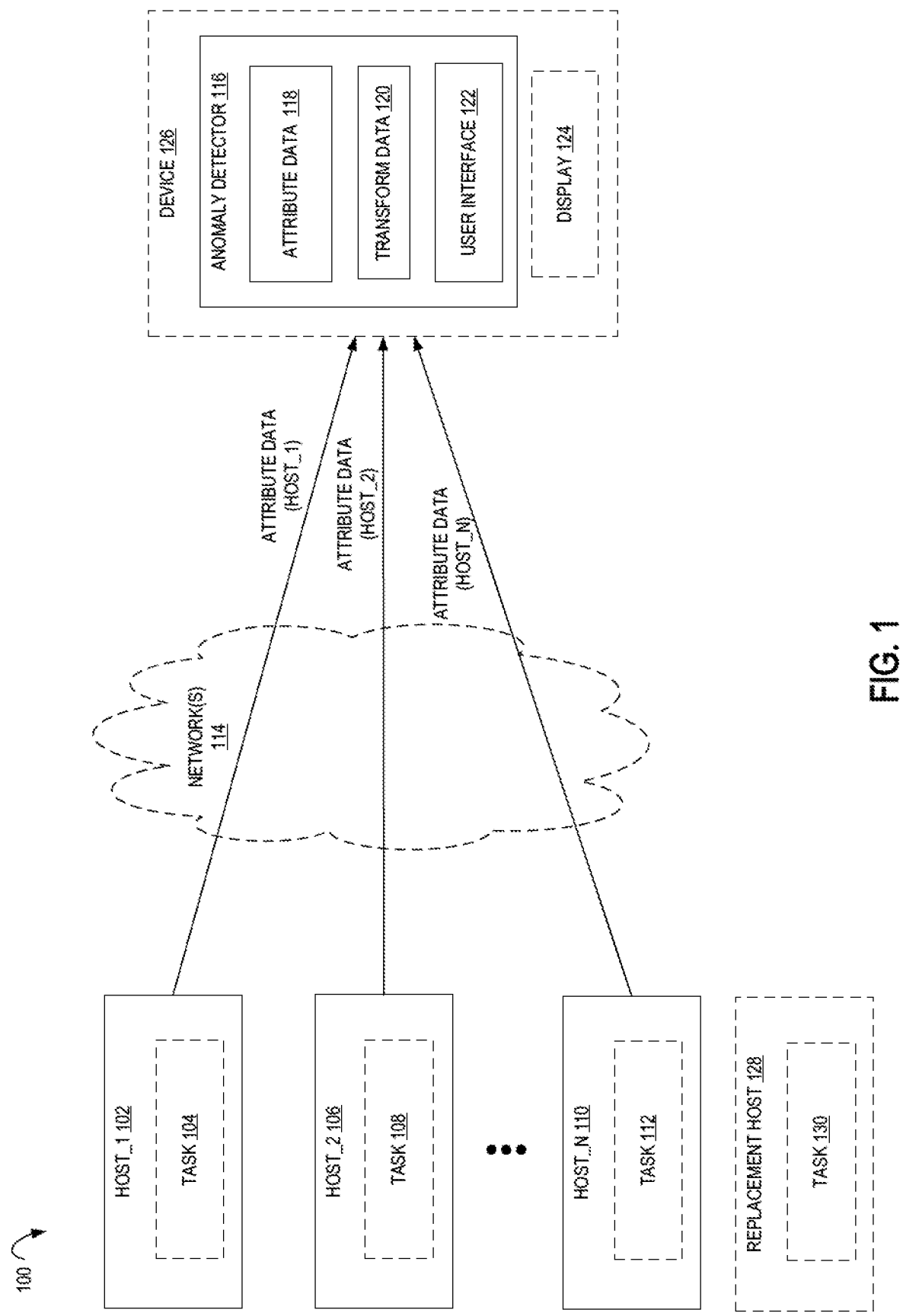
FIG. 1 is a diagram illustrating an environment including a plurality of hosts generating and sending attribute data to an anomaly detector according to some embodiments.

Various embodiments of methods, apparatuses, systems, and non-transitory computer-readable storage media for anomaly detection in hosts are described. According to some embodiments, an anomaly in an individual host of a group of at least three hosts to which a task is distributed is detected using data generated from Fourier components. In one embodiment, an anomaly detector detects an individual host's anomaly or anomalies, rather than merely anomalous behavior of the group as a whole.

In certain embodiments, within a group of hosts, each host's measured attribute (e.g. processing utilization (%) data), is measured over time. The collection of such data is treated as a waveform, and its Fourier components are determined, e.g., up to a selected frequency. One by one, each Fourier component is collected from the group of hosts and has a mean and a standard deviation determined for certain of these embodiments. This provides the detector with the following data: (1) each host's Fourier component value set (e.g., as a respective Fourier component vector) and (2) the collective mean (e.g., as a mean value vector) and a standard deviation of each Fourier component within the group (e.g., as a respective standard deviation vector). The generated data is then used to determine if there is an anomalous host in that group of hosts, e.g., and the identification of that particular anomalous host. In certain embodiments, for each host, its set of Fourier component values are expressed in terms of the number of standard deviations from the mean, and that information is utilized to determine if there is an anomalous host in that group of hosts, e.g., and the identification of that particular anomalous host. An indication is then generated for hosts found to be anomalous (e.g., have significant deviations from the mean (e.g., average behavior)). As one example, the indication is a graph of the attribute data (e.g., processing utilization data) for the anomalous host and at least one other of the plurality of hosts. As another example, the indication is a graph of the attribute data (e.g., processing utilization data) for the anomalous host and at least two other of the plurality of hosts, e.g., to provide context against the anomalous host, showing what non-anomalous behavior looks like, which includes a normal amount of variance between the at least two non-anomalous hosts.

One challenge of identifying an anomalous host of a group of hosts is the sheer quantity of attribute data generated by the hosts. See, e.g., FIG. 2 for an example of attribute data for three hosts. The number of hosts may be any number though, for example, 10s, 100s, 1000s, 10000s, etc. By utilizing the Fourier components to create an indication as discussed herein, the amount of data reviewed to determine an anomalous host is greatly reduced. For example, with an advantage of this approach being that it precludes the need to visually examine plots, saving much time and effort while being able to distinguish anomalous behavior that is easily obscured when plotting a large number of hosts. Plots that summarize the behavior of a large number of hosts (e.g. graphs which plot the highest values, at each time coordinate, of the aggregate) are not able to reveal hosts running at lower-than-average values or with anomalous inflections below aggregate maxima, in sharp contrast to utilizing the embodiments discussed herein. Thus, the embodiments herein improve the functioning of an anomaly detector by allowing detection of a host anomaly that cannot practicably be performed in the mind or with pen and paper.

FIG. 1 is a diagram illustrating an environment 100 including a plurality of hosts (102, 106, 110) generating and sending attribute data to an anomaly detector 116 according to some embodiments. In one embodiment, the plurality of hosts is any number "N" of hosts, where N is a positive integer of three or greater. As one example, host_1 102 performs task 104, host_2 106 performs task 108, and host_N 110 performs task 112. In one embodiment, tasks are each a subset of a single task being cumulatively performed by a group of hosts (e.g., hosts 102, 106, 110). In one embodiment, the tasks are a large number of requests for a similar task that are divided among a sufficient number of hosts to keep up with the demand, e.g., a similar task divided across that set of hosts such that each measured attribute is expected to be nearly the same for each host. In one embodiment, the group of hosts is an autoscaling group in a software deployment environment. In certain embodiments, a host is a computing device (e.g., or a virtual machine executing on a computing device). A host may be computing device 1000 in FIG. 10. One or more replacement hosts (e.g., replacement host 128) may be present, for example, to swap in place of a host that is detected to be anomalous. For example, if host_2 106 is the anomalous host, swapping the performance of task 108 onto replacement host 128 as task 130.

Anomaly may be in the software and/or hardware of a host. Hosts may be coupled together, e.g., via network(s) 114. One or more networks 114 can include any appropriate network, including an intranet, the Internet, a cellular network, a local area network, or any other such network or combination thereof.

Depicted hosts 102, 106, 110 (for example, and host 128 if swapped into the group, e.g., as replacement for an anomalous host) are to send their respective attribute data to anomaly detector 116. In one embodiment, the attribute data is processing utilization data (for example, the percentage of the processing resources of a host being utilized for a given period of time, e.g., for each consecutive five-minute period) (e.g., with each data point representing a 5-minute average for a total of 288 points per day). In another embodiment, attribute data is traffic level data, e.g., the amount of traffic being sent and/or received by a host. In yet another embodiment, attribute data is latency (e.g., time from when a request is received until it is fulfilled). In another embodiment, attribute data is bytes read or written to the network utilized by the hosts.

Anomaly detector 116 includes storage for attribute data 118 from the hosts, e.g., respective storage for the attribute data of each host being monitored. Anomaly detector 116 includes a user interface 122, e.g., to allow a user to configure an anomaly detection service (e.g., anomaly detector 116 thereof). Optionally, anomaly detector is a component of a device 126 (e.g., computing device) and may include a display 124, for example, to display the data (e.g., graph 400 from FIG. 4) discussed herein. Anomaly detector 116 includes storage for transform data 120 generated as discussed herein. In one embodiment, anomaly detector 116 generates transform data 120 from attribute data and uses transform data 120 to determine an anomalous host of hosts (e.g., of hosts 102, 106, 110). For example, with anomaly detector 116 determining a plurality of Fourier component values for the attribute data (e.g., a set of processing utilization data collected over a period of time and forming a waveform) and using the Fourier component values to generate additional data that indicates the (e.g., likely) presence (or not) of an anomaly with a host. In one embodiment, the Fourier components (e.g., one for each frequency being considered) are generated utilizing one or both of the following (for example, with the numbers being complex numbers, e.g., of the form of cos+i*sin):

$$X_k = \sum_{n=0}^{N-1} x_n \cdot e^{-i2\pi kn/N} \quad (1)$$

$$x_n = \frac{1}{N}\sum_{k=0}^{N-1} X_k \cdot e^{i2\pi kn/N} \quad (2)$$

Where N=number of time samples, n=current sample being considered (0 . . . N−1), $x_n$=value of the signal at time n, k=current frequency being considered (e.g., 0 Hertz up to N/2 Hertz), and $X_k$=amount of frequency k in the signal (e.g., amplitude and phase as a complex number).

An example of attribute data 118 is discussed below in reference to FIG. 2 and examples of transform data 120 are discussed below in reference to FIGS. 3A-3D.

FIG. 2 is a diagram illustrating attribute data according to some embodiments. Depicted attribute data includes a time stamp 202 (e.g., including year, month, day) as well as the processing utilization data 204 (e.g., percentage between 0-100 here) for a plurality of hosts (e.g., processing utilization data 206 for host 1, processing utilization data 208 for host 2, and processing utilization data 210 for host 3). In one embodiment, the activating of anomaly detector causes the collection of attribute data (e.g., sampled at a given interval, such as, but not limited to, the average for a given time period) for each of the monitored hosts. It should be understood that attribute data in FIG. 2 is an example. More than 3 hosts may be monitored and/or more (e.g., 100s, 1000s, 10000s of) data points may be utilized.

FIGS. 3A-3D are diagrams illustrating transform data 120 according to some embodiments. Transform data depicted in FIG. 3A includes a column 302 (e.g., of indices) identifying the respective Fourier component determined for a given input set of attribute data, for example, 0 being the initial (e.g., zeroth) Fourier component (e.g., $X_0$ of the above (1)), 1 being the first Fourier component (e.g., $X_1$ of the above (1)), etc. In FIGS. 3A-3D, four Fourier components (0-3) are depicted, but in certain embodiments, only a single Fourier component (or any plurality of Fourier components) may be generated. Transform data in FIG. 3A includes amplitude values 304 (e.g., as a vector) and phase values 306 (e.g., as a vector) for the respective Fourier components for host 1, for example, with amplitude value 324 for the second Fourier component for host 1. Transform data in FIG. 3A includes amplitude values 308 (e.g., as a vector) and phase values 310 (e.g., as a vector) for the respective Fourier components for host 2, for example, with amplitude value 326 for the second Fourier component for host 2. Transform data in FIG. 3A includes amplitude values 312 (e.g., as a vector) and phase values 314 (e.g., as a vector) for the respective Fourier components for host 3, for example, with amplitude value 328 for the second Fourier component for host 3.

In certain embodiments, these Fourier components are then used to generate the mean values (e.g., as a vector) for each Fourier component (e.g., element position in a vector) for all the hosts and the standard deviations (e.g., as a vector) for each Fourier component (e.g., element position in a vector) for all the hosts. In one embodiment, the amplitude Fourier components are then used to generate the amplitude mean values 316 (e.g., as a vector) for amplitudes of each Fourier component (e.g., element position in a vector) for all the hosts and the amplitude standard deviations 318 (e.g., as a vector) for amplitudes of each Fourier component (e.g., element position in a vector) for all the hosts. For example, where the mean value 330 for the amplitude second Fourier component 324 of host 1, amplitude second Fourier component 326 of host 2, and amplitude second Fourier component 328 of host 3 is the average of those three amplitude values (e.g., (1.573+1.538+2.111)/3=1.741 average with a (e.g., sample) standard deviation of 0.321). The sample standard deviation (e.g., standard deviation 332 for amplitude second Fourier components 324, 326, 328 of hosts 1-3) may be found by finding the mean value (e.g., mean value 330) and then, for each data point ($x_i$), find the square of its distance to the mean to generate values, sum those values, divide by the number of data points (N) minus one, and then take the square root and the resulting answer is the sample standard deviation (s), for example, $$s = \sqrt{\frac{1}{N-1} \sum_{i=1}^{N} (x_i - \bar{x})^2} \quad (3)$$

where $\bar{x}$ is the sample mean and $x_i$ is the $i^{th}$ sample.

Additionally or alternatively, the phase Fourier components are used to generate the phase mean values 320 (e.g., as a vector) for phases of each Fourier component (e.g., element position in a vector) for all the hosts and the phase standard deviations 322 (e.g., as a vector) for phases of each Fourier component (e.g., element position in a vector) for all the hosts. FIG. 3B illustrates that for each host, in certain embodiments its set of Fourier components (e.g., amplitude and/or phase) are expressed as a number of standard deviations from a respective mean, for example, the number of standard deviations for the amplitude values 334 (e.g., as a vector) for each Fourier component (e.g., element position in a vector) for host 1, the number of standard deviations for the phase values 336 (e.g., as a vector) for each Fourier component (e.g., element position in a vector) for host 1, the number of standard deviations for the amplitude values 338 (e.g., as a vector) for each Fourier component (e.g., element position in a vector) for host 2, the number of standard deviations for the phase values 340 (e.g., as a vector) for each Fourier component (e.g., element position in a vector) for host 2, the number of standard deviations for the amplitude values 342 (e.g., as a vector) for each Fourier component (e.g., element position in a vector) for host 3, and the number of standard deviations for the phase values 344 (e.g., as a vector) for each Fourier component (e.g., element position in a vector) for host 3 using the respective amplitude mean values 316 from FIG. 3A and standard deviations 318 from FIG. 3A. As an example, the number of standard deviations 346 for the amplitude second Fourier component 324 of host 1 is determined by subtracting the mean value 330 for the amplitude second Fourier component of hosts 1-3 from the amplitude second Fourier component 324 of host 1, and dividing that difference by the standard deviation 332 for amplitude second Fourier components 324, 326, 328 of hosts 1-3 to generate the number of standard deviations 346 for the amplitude second Fourier component 324 of host 1. As another example, the number of standard deviations 348 for the amplitude second Fourier component 326 of host 2 is determined by subtracting the mean value 330 for the amplitude second Fourier component of hosts 1-3 from the amplitude second Fourier component 326 of host 2, and dividing that difference by the standard deviation 332 for amplitude second Fourier components 324, 326, 328 of hosts 1-3 to generate the number of standard deviations 348 for the amplitude second Fourier component 326 of host 2. As yet another example, the number of standard deviations 350 for the amplitude second Fourier component 328 of host 3 is determined by subtracting the mean value 330 for the amplitude second Fourier component of hosts 1-3 from the amplitude second Fourier component 328 of host 3, and dividing that difference by the standard deviation 332 for amplitude second Fourier components 324, 326, 328 of hosts 1-3 to generate the number of standard deviations 350 for the amplitude second Fourier component 328 of host 3. Additionally or alternatively, the number of standard deviations for phase Fourier components of each host 1 is determined by subtracting the mean value for the phase Fourier component of hosts 1-3 from the phase Fourier component of a particular host, and dividing that difference by the standard deviation for phase Fourier components of hosts 1-3 to generate the number of standard deviations for the phase Fourier component of that particular host.

Thus, the transform data may be utilized to indicate an anomalous host, for example, when at least one threshold is exceeded (or met). In one embodiment, the transform data 120 is used to determine that the number of standard deviations 350 for the amplitude second Fourier component 328 of host 3 is 1.153 deviations away from the mean value 330 (e.g., greater than a threshold of one standard deviation) and thus triggers an indication that host 3 is an anomalous host, e.g., in contrast to the number of standard deviations 346 for the amplitude second Fourier component 324 of host 1 being −0.522 (absolute value of 0.522) deviations away from the mean value 330 (e.g., less than a threshold of one (e.g., absolute value of) standard deviation) and the number of standard deviations 348 for the amplitude second Fourier component 326 of host 2 being −0.631 (absolute value of 0.631) deviations away from the mean value 330 (e.g., less than a threshold of one (e.g., absolute value of) standard deviation). In certain embodiments, a threshold of standard deviations above the mean per Fourier component is set differently than the threshold below the mean. In certain embodiments, every Fourier component has individualized pairs of thresholds (e.g., for a number of acceptable standard deviations above and below the mean, respectively).

In one embodiment, each Fourier component (e.g., each row for index 302) has its own respective threshold. In one embodiment, a first threshold value is input (e.g., via user interface 122 in FIG. 1) for an initial (first or zeroth) Fourier component (index 0) of hosts and a second, different threshold is input (e.g., via user interface 122 in FIG. 1) for the other Fourier component or component(s) (e.g., indices 1-3) of hosts.

There are several configurations that may be used to determine the threshold for reporting a host as anomalous (e.g., deviant). For example, configuration one uses the number of standard deviations from the mean in an initial (e.g., first or zeroth) Fourier component (e.g., the average value of the collected values for a host) to indicate anomalous behavior. In one embodiment, the initial (e.g., first) Fourier component is given a separate threshold value that detects anomalous behavior with high probability when a smaller threshold value is exceeded. For example, configuration two uses the total number of Fourier components (e.g., component 1 and so forth) that each cross a threshold (e.g., a threshold set by configuration 1) before a host is reported as anomalous. Other configurations that may be used include a Fourier component upper limit, selected environments to scan (e.g., set in a configuration file, possibly limited by command line arguments), time (e.g., number of days) over which to collect data, data resolution (how much time between data points), etc. In one embodiment, the length of time is selected such that the beginning and end data points are approximately equal. This can be enforced, without loss of information, by subtracting (from each raw data set) a straight line function connecting the mean values of the initial and final data points of the time window.

In one embodiment, separate thresholds are used for each Fourier component.

In one embodiment, only specific Fourier components are evaluated, for example, with a number chosen (by configuration) that is used to select that number of highest-ranking Fourier components when these are sorted by amplitude, e.g., with the Fourier components of lowest amplitude being the noisiest parts of the Fourier transformed data when considering the whole group of hosts.

In certain embodiments, a particular number of standard deviations is changed into the likelihood of seeing an event with that number of standard deviations as its characteristic. With this information, calculation can be made for each component's deviation value that gives a probability value of normalcy. The total probability of normalcy will be the product of all such values among the components that have been selected for evaluation. These total probability scores from each host can be ranked, and a cluster of highest-ranking scores can be observed at the high-value end of the distribution, distinguishing those from the more likely anomalous hosts' scores.

In certain embodiments, the number of hosts is large enough to show the anomalous host without removing the anomalous host's data (e.g., attribute data) from the determination of anomalous host(s). For example, with only three hosts, one outlier may significantly affect the mean value such that the (e.g., absolute) values of the deviations do not depict such a stark comparison as if the outlier were compared against a larger number of non-anomalous hosts (e.g., 2 or more).

Certain embodiments herein remove a (e.g., suspected anomalous) host from consideration for mean and standard deviation determinations. In one embodiment, this is done by forming the mean and standard deviation values for all hosts except for the current host being inspected for being an anomalous host. For example, with detection of an anomaly resulting when standard deviations become much smaller as a result of removing one host from calculations that generate the mean and standard deviation values.

FIGS. 3C-3D illustrate a similar example to FIGS. 3A-3B, but the amplitude Fourier components are then used to generate the amplitude mean values 352 (e.g., as a vector) for amplitudes of each Fourier component (e.g., element position in a vector) for all the hosts except the host that is being analyzed for being anomalous and/or the amplitude standard deviations 358 (e.g., as a vector) for amplitudes of each Fourier component (e.g., element position in a vector) for all the hosts except the host that is being analyzed for being anomalous. As one example (in contrast to the mean value 330 and standard deviation 332 in FIG. 3A for all hosts), the mean value 356 is determined for the amplitude second Fourier component 324 of host 1 and amplitude second Fourier component 326 of host 2, and not the amplitude second Fourier component 328 of host 3 is the average of those two amplitude values (e.g., (1.573+1.538)/2=1.556 average with a (e.g., sample) standard deviation of 0.025). The sample standard deviation (e.g., standard deviation 358 for amplitude second Fourier components 324, 326 of hosts 1-2) may be found by finding the mean value (e.g., mean value 356) and then, for each data point, find the square of its distance to the mean to generate values, sum the values, divide by the number of data points minus one, and then take the square root and the resulting answer is the sample standard deviation. Additionally or alternatively, in one embodiment, the phase Fourier components are then used to generate the phase mean values 320 (e.g., as a vector) for phases of each Fourier component (e.g., element position in a vector) for all the hosts and the phase standard deviations 322 (e.g., as a vector) for phases of each Fourier component (e.g., element position in a vector) for all the hosts. The removal of the data for the host being analyzed may also be utilized on the phase data (e.g., when determining the mean and standard deviation values for a group).

FIG. 3D illustrates that for each host, in certain embodiments its set of Fourier components (e.g., amplitude and/or phase) are expressed as a number of standard deviations from a respective mean of less than all of the hosts, for example, the number of standard deviations for the amplitude values 360 (e.g., as a vector) for each Fourier component (e.g., element position in a vector) for host 1, the number of standard deviations for the amplitude values 362 (e.g., as a vector) for each Fourier component (e.g., element position in a vector) for host 2, and the number of standard deviations for the phase values 364 (e.g., as a vector) for each Fourier component (e.g., element position in a vector) for host 3 using the amplitude mean values 352 from FIG. 3C and standard deviations 354 from FIG. 3C. FIG. 3D further illustrates that the number of standard deviations 370 for the amplitude second Fourier component 328 of host 3 is determined by subtracting the mean value 356 for the amplitude second Fourier component of hosts 1-2 from the amplitude second Fourier component 328 of host 3, and dividing that difference by the standard deviation 358 for amplitude second Fourier components 324, 326 of hosts 1-2 to generate the number of standard deviations 370 for the amplitude second Fourier component 328 of host 3.

Thus, the transform data may be utilized to indicate an anomalous host, for example, when at least one threshold is exceeded (or met). In one embodiment, the transform data 120 is used to determine the number of standard deviations 370 for the amplitude second Fourier component 328 of host 3 is 22.446 deviations away from the mean value 356 (e.g., far greater than a threshold of three standard deviations) and thus triggers an indication that host 3 is an anomalous host, e.g., in contrast to the number of standard deviations 366 for the amplitude second Fourier component 324 of host 1 being 0.707 (absolute value of 0.707) deviations away from the mean value 356 (e.g., less than a threshold of three (e.g., absolute value of) standard deviation) and the number of standard deviations 368 for the amplitude second Fourier component 326 of host 2 being −0.707 (absolute value of 0.707) deviations away from the mean value 356 (e.g., less than a threshold of three (e.g., absolute value of) standard deviation). In one embodiment, each Fourier component (e.g., each row with index 302) has its own respective threshold. In one embodiment, a first threshold value is input (e.g., via user interface 122 in FIG. 1) for an initial (e.g., first or zeroth) Fourier component (index 0) of hosts and a second, different threshold is input (e.g., via user interface 122 in FIG. 1) for the other Fourier components (e.g., indices 1-3) of hosts.

In certain embodiments, each host, in turn, is removed when calculating mean and standard deviations (SD) of the group, and the mean and standard values are then used for all hosts when expressing deviations from the mean in terms of standard deviations, for example, if one of these exclusions results in much lower deviations for all other hosts, then the anomaly will present much more dramatically, after its influence is removed in the calculation of mean and standard deviations of normally behaving hosts.

In certain embodiments, an indication for a host (or hosts) that is implicated as anomalous is a presentation of (e.g., generation of a uniform resource locator (URL) value for) a graph (e.g., plot) of data (e.g., attribute data versus time) for the anomalous host with one or more non-anomalous hosts from the same group. In these embodiments, the user (e.g., operator) of the detector can quickly observe whether the behavior is a concern. This alleviates the task of visually poring over plots of all the different services that need watching, looking for manifestations of anomalies. The embodiments herein thus allow the data in these plots to be characterized numerically and interpreted mathematically, reducing the time spent looking for anomalous hosts.

Figure 4:
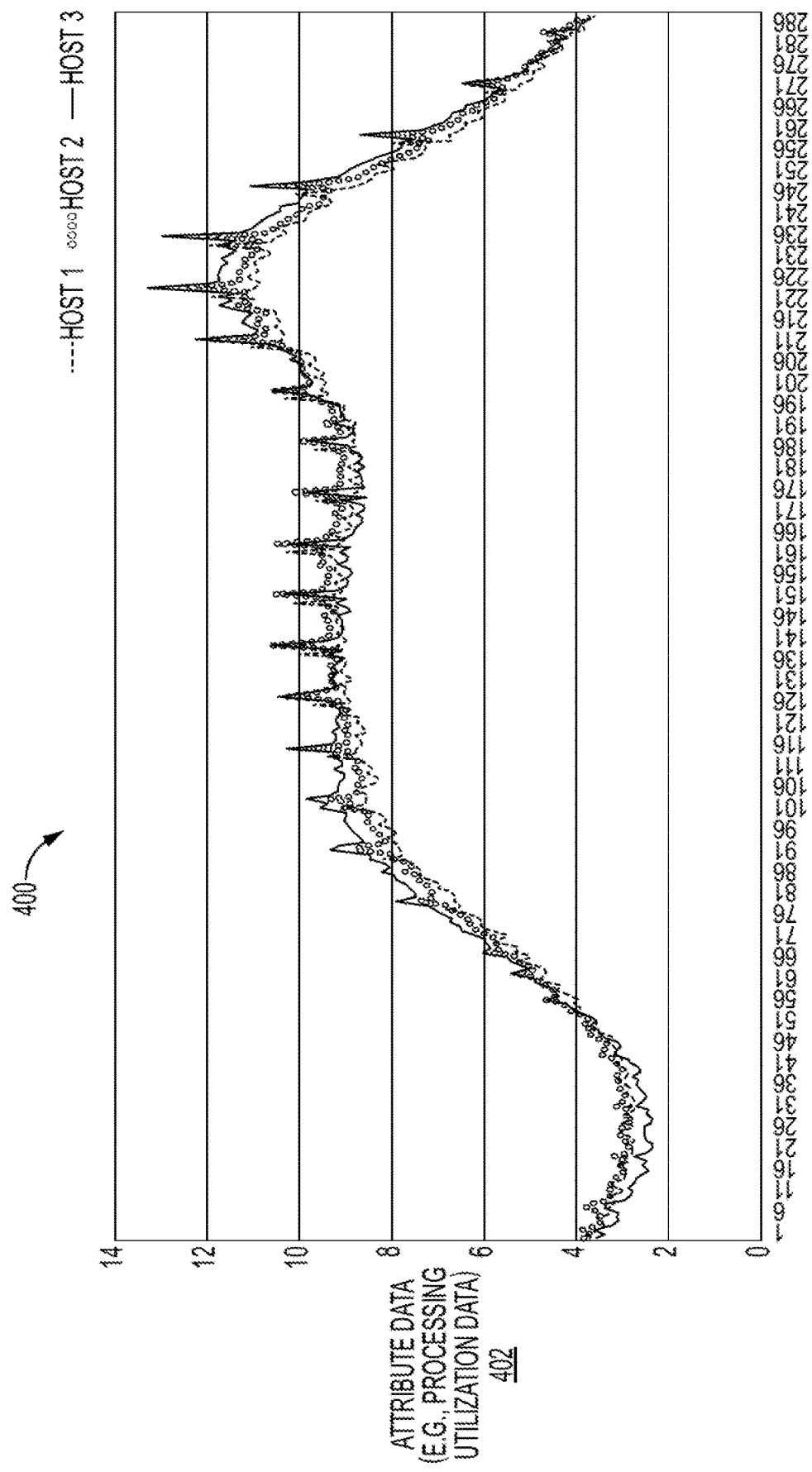
FIG. 4 is a graph illustrating attribute data versus time according to some embodiments.

FIG. 4 is a graph 400 illustrating attribute data 402 versus time 404 (e.g., in minutes) according to some embodiments. Graph 400 illustrates attribute data 402 versus time 404 from each of hosts 1-3. In certain embodiments, anomaly detector is to detect an anomalous host (e.g., host 3 in FIGS. 3A-3D) and cause the display of graph 400 (e.g., by sending a URL to a user that causes the graph to be displayed when selected) showing attribute data (e.g., attribute data 118 from FIG. 1 or 2) (e.g., and not showing transform data 120) for the anomalous host along with one or more non-anomalous hosts from the same group under scrutiny. In one embodiment, a user can then evaluate if the situation is actionable, e.g., if it had a temporary deviation that was already resolved or not.

In certain embodiments, transform data (e.g., along with the aforementioned actionability decisions) is used as a training set for artificial intelligence model, which would, after sufficient training, take over making decisions.

In one embodiment, the indication for an anomalous host includes the name of that host, e.g., followed by a (e.g., indented) list of all the Fourier components that exceeded the (e.g., preset) limit of standard deviations from the mean. In one embodiment, the zeroth component is exceeded by a proper subset of hosts in a group of three or more hosts and this proper subset of hosts are replaced so they are not overwhelmed in a sudden surge of high loads. In one embodiment, implicated hosts displaying higher attribute values than their normal peers may be subject to being overwhelmed in a sudden surge of high loads. This vulnerability may then be precluded by replacing such anomalous hosts.

Figure 5:
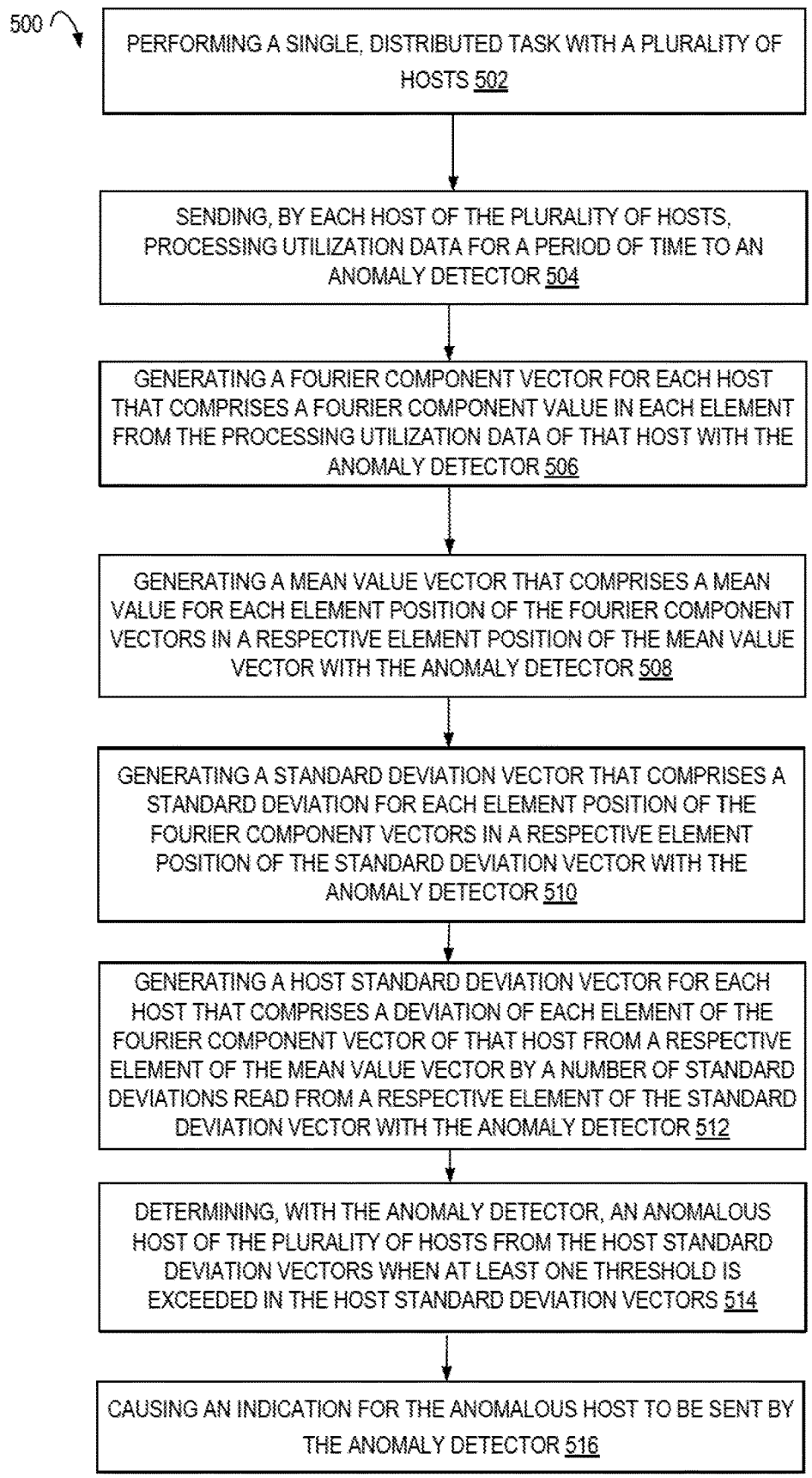
FIG. 5 is a flow diagram illustrating operations of a method for anomaly detection based on processing utilization data of hosts according to some embodiments.

FIG. 5 is a flow diagram 500 illustrating operations of a method for anomaly detection based on processing utilization data of hosts according to some embodiments. Flow diagram 500 includes performing a single, distributed task with a plurality of hosts 502, sending, by each host of the plurality of hosts, processing utilization data for a period of time to an anomaly detector 504, generating a Fourier component vector for each host that comprises a Fourier component value in each element from the processing utilization data of that host with the anomaly detector 506, generating a mean value vector that comprises a mean value for each element position of the Fourier component vectors in a respective element position of the mean value vector with the anomaly detector 508, generating a standard deviation vector that comprises a standard deviation for each element position of the Fourier component vectors in a respective element position of the standard deviation vector with the anomaly detector 510, generating a host standard deviation vector for each host that comprises a deviation of each element of the Fourier component vector of that host from a respective element of the mean value vector by a number of standard deviations read from a respective element of the standard deviation vector with the anomaly detector 512, determining, with the anomaly detector, an anomalous host of the plurality of hosts from the host standard deviation vectors when at least one threshold is exceeded in the host standard deviation vectors 514, and causing an indication for the anomalous host to be sent by the anomaly detector 516.

Figure 6:
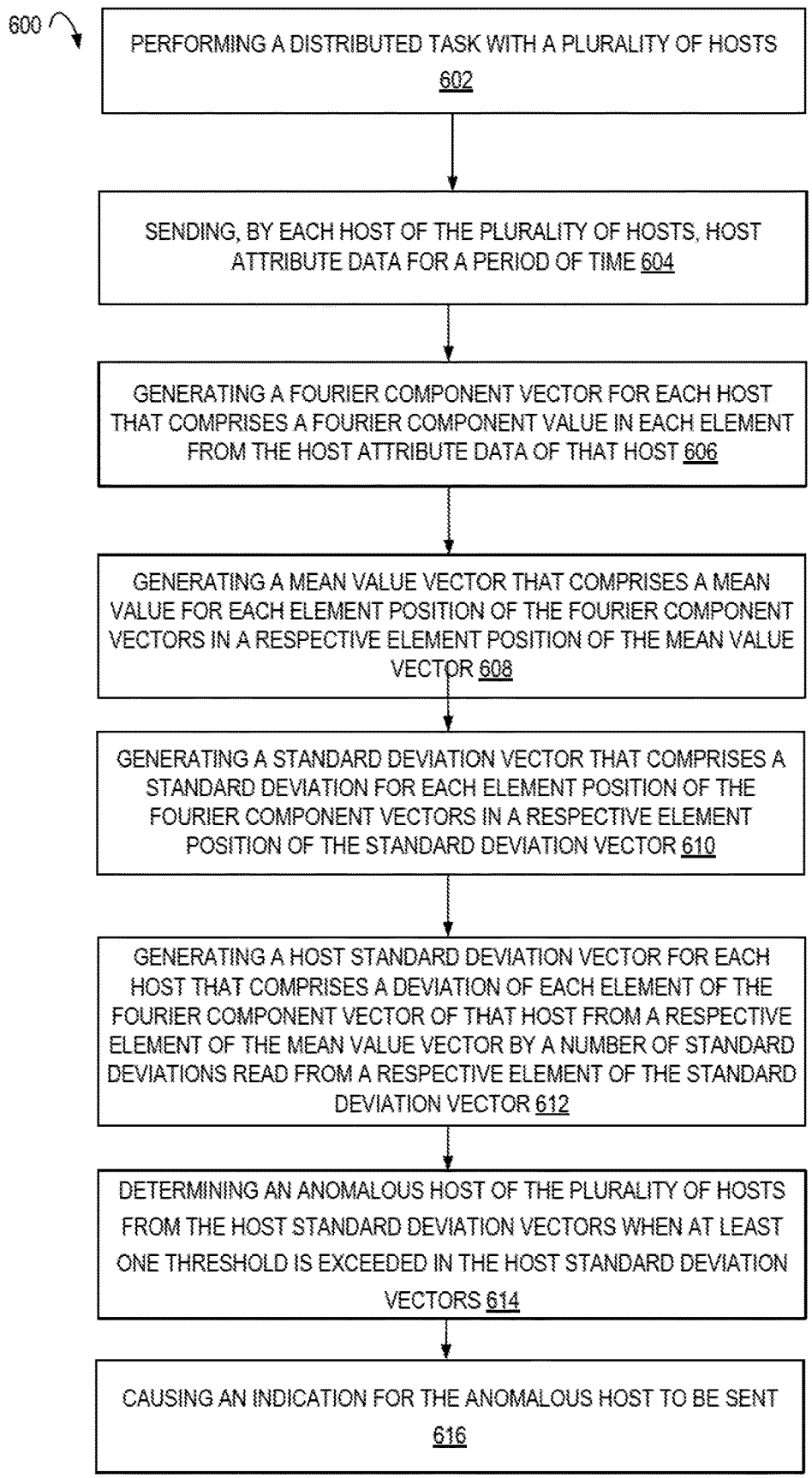
FIG. 6 is a flow diagram illustrating operations of a method for anomaly detection based on attribute data of hosts according to some embodiments.

FIG. 6 is a flow diagram 600 illustrating operations of a method for anomaly detection based on attribute data of hosts according to some embodiments. Flow diagram 600 includes performing a distributed task with a plurality of hosts 602, sending, by each host of the plurality of hosts, host attribute data for a period of time 604, generating a Fourier component vector for each host that comprises a Fourier component value in each element from the host attribute data of that host 606, generating a mean value vector that comprises a mean value for each element position of the Fourier component vectors in a respective element position of the mean value vector 608, generating a standard deviation vector that comprises a standard deviation for each element position of the Fourier component vectors in a respective element position of the standard deviation vector 610, generating a host standard deviation vector for each host that comprises a deviation of each element of the Fourier component vector of that host from a respective element of the mean value vector by a number of standard deviations read from a respective element of the standard deviation vector 612, determining an anomalous host of the plurality of hosts from the host standard deviation vectors when at least one threshold is exceeded in the host standard deviation vectors 614, and causing an indication for the anomalous host to be sent 616.

Exemplary environments, systems, etc. that the above may be used in are detailed below.

At least some embodiments of the disclosed technologies can be described in view of the following examples:

Example 1

A computer-implemented method comprising:
performing a single, distributed task with a plurality of hosts;
sending, by each host of the plurality of hosts, processing utilization data for a period of time to an anomaly detector;
generating a Fourier component vector for each host that comprises a Fourier component value in each element from the processing utilization data of that host with the anomaly detector;
generating a mean value vector that comprises a mean value for each element position of the Fourier component vectors in a respective element position of the mean value vector with the anomaly detector;
generating a standard deviation vector that comprises a standard deviation for each element position of the Fourier component vectors in a respective element position of the standard deviation vector with the anomaly detector;
generating a host standard deviation vector for each host that comprises a deviation of each element of the Fourier component vector of that host from a respective element of the mean value vector by a number of standard deviations read from a respective element of the standard deviation vector with the anomaly detector;
determining, with the anomaly detector, an anomalous host of the plurality of hosts from the host standard deviation vectors when at least one threshold is exceeded in the host standard deviation vectors; and
causing an indication for the anomalous host to be sent by the anomaly detector.

Example 2

The computer-implemented method of example 1, wherein the at least one threshold comprises a first threshold for an element position of the host standard deviation vectors corresponding to a zeroth component of the Fourier component vectors, and a second, different threshold for another element position of the host standard deviation vectors or comprises an independent threshold value for each component of the Fourier component vectors (e.g., where the threshold limits set for each such component differ in value between the thresholds above and below the mean value).

Example 3

The computer-implemented method of example 1, wherein the indication for the anomalous host causes a display of a graph of the processing utilization data for the anomalous host and at least one other of the plurality of hosts.

Example 4

A computer-implemented method comprising:
performing a distributed task with a plurality of hosts;
sending, by each host of the plurality of hosts, host attribute data for a period of time;
generating a Fourier component vector for each host that comprises a Fourier component value in each element from the host attribute data of that host;
generating a mean value vector that comprises a mean value for each element position of the Fourier component vectors in a respective element position of the mean value vector;
generating a standard deviation vector that comprises a standard deviation for each element position of the Fourier component vectors in a respective element position of the standard deviation vector;
generating a host standard deviation vector for each host that comprises a deviation of each element of the Fourier component vector of that host from a respective element of the mean value vector by a number of standard deviations read from a respective element of the standard deviation vector;
determining an anomalous host of the plurality of hosts from the host standard deviation vectors when at least one threshold is exceeded in the host standard deviation vectors; and
causing an indication for the anomalous host to be sent.

Example 5

The computer-implemented method of example 4, wherein the at least one threshold comprises a first threshold for an element position of the host standard deviation vectors corresponding to a zeroth component of the Fourier component vectors, and a second, different threshold for another element position of the host standard deviation vectors.

Example 6

The computer-implemented method of example 4, wherein the indication for the anomalous host causes a display of a graph of the host attribute data for the anomalous host and at least one other of the plurality of hosts.

Example 7

The computer-implemented method of example 4, wherein the at least one threshold comprises a threshold for an element position of the host standard deviation vectors corresponding to a zeroth component of the Fourier component vectors.

Example 8

The computer-implemented method of example 4, wherein the determining the anomalous host comprises determining that a plurality of elements of a host standard deviation vector for the anomalous host exceeds the at least one threshold.

Example 9

The computer-implemented method of example 4, wherein the plurality of hosts comprises at least three hosts.

Example 10

The computer-implemented method of example 4, wherein the host attribute data is processing utilization data.

Example 11

The computer-implemented method of example 4, wherein the host attribute data is latency data of the plurality of hosts.

Example 12

The computer-implemented method of example 4, wherein the indication is a uniform resource locator value sent to a user.

Example 13

The computer-implemented method of example 12, wherein the uniform resource locator value is for a graph of the host attribute data for the anomalous host and at least one other of the plurality of hosts.

Example 14

The computer-implemented method of example 4, further comprising replacing the anomalous host with a replacement host to perform a portion of the distributed task.

Example 15

A non-transitory machine readable medium that stores code that when executed by a machine causes the machine to perform a method comprising:
performing a distributed task with a plurality of hosts;
sending, by each host of the plurality of hosts, host attribute data for a period of time;
generating a Fourier component vector for each host that comprises a Fourier component value in each element from the host attribute data of that host;
generating a mean value vector that comprises a mean value for each element position of the Fourier component vectors in a respective element position of the mean value vector;

generating a standard deviation vector that comprises a standard deviation for each element position of the Fourier component vectors in a respective element position of the standard deviation vector;

generating a host standard deviation vector for each host that comprises a deviation of each element of the Fourier component vector of that host from a respective element of the mean value vector by a number of standard deviations read from a respective element of the standard deviation vector;

determining an anomalous host of the plurality of hosts from the host standard deviation vectors when at least one threshold is exceeded in the host standard deviation vectors; and causing an indication for the anomalous host to be sent.

Example 16

The non-transitory machine readable medium of example 15, wherein the at least one threshold comprises a first threshold for an element position of the host standard deviation vectors corresponding to a zeroth component of the Fourier component vectors, and a second, different threshold for another element position of the host standard deviation vectors.

Example 17

The non-transitory machine readable medium of example 15, wherein the indication for the anomalous host causes a display of a graph of the host attribute data for the anomalous host and at least one other of the plurality of hosts.

Example 18

The non-transitory machine readable medium of example 15, wherein the at least one threshold comprises a threshold for an element position of the host standard deviation vectors corresponding to a zeroth component of the Fourier component vectors.

Example 19

The non-transitory machine readable medium of example 15, wherein the determining the anomalous host comprises determining that a plurality of elements of a host standard deviation vector for the anomalous host exceeds the at least one threshold.

Example 20

The non-transitory machine readable medium of example 15, wherein the indication is a uniform resource locator value sent to a user.

Figure 7:
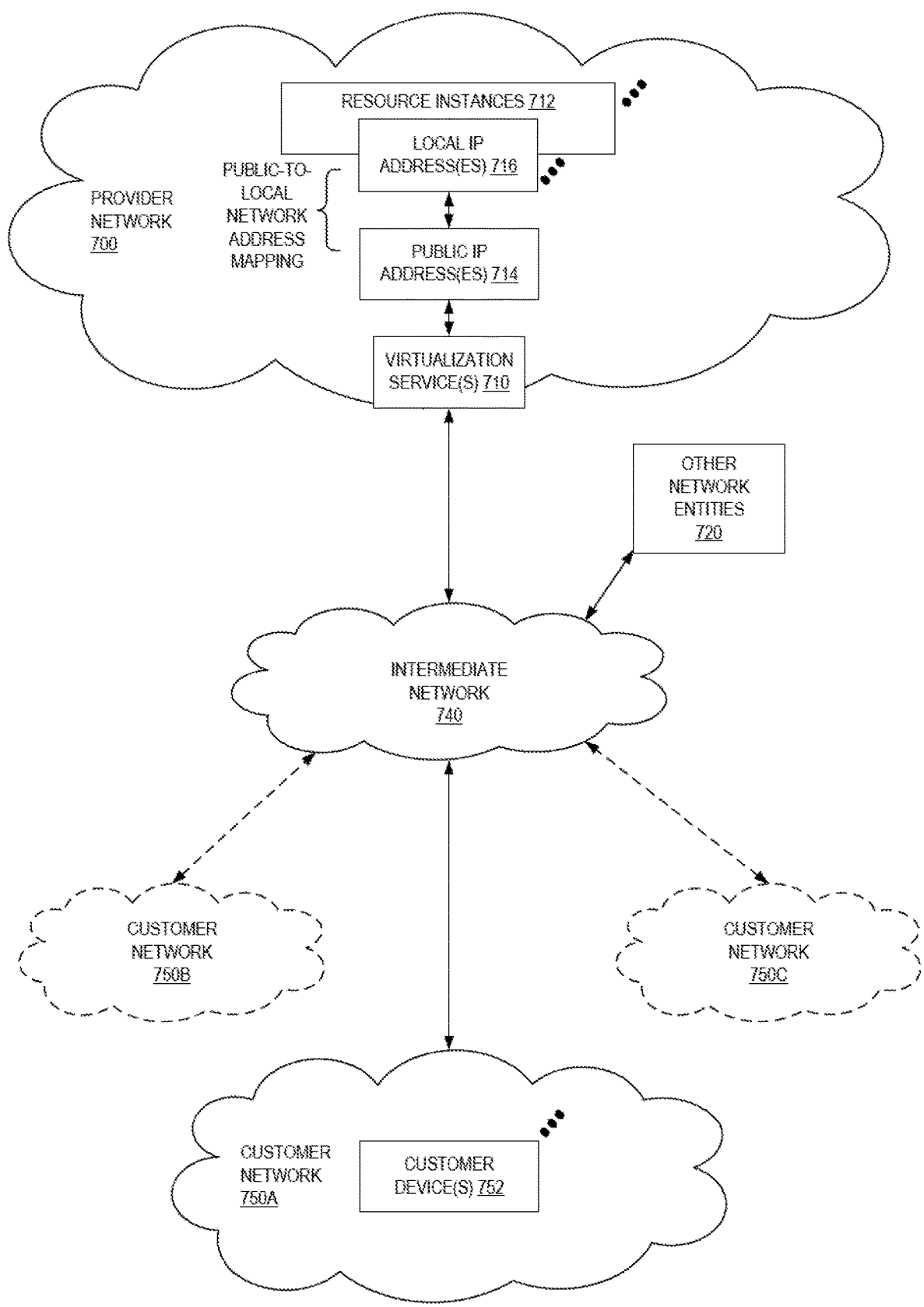
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses.

Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
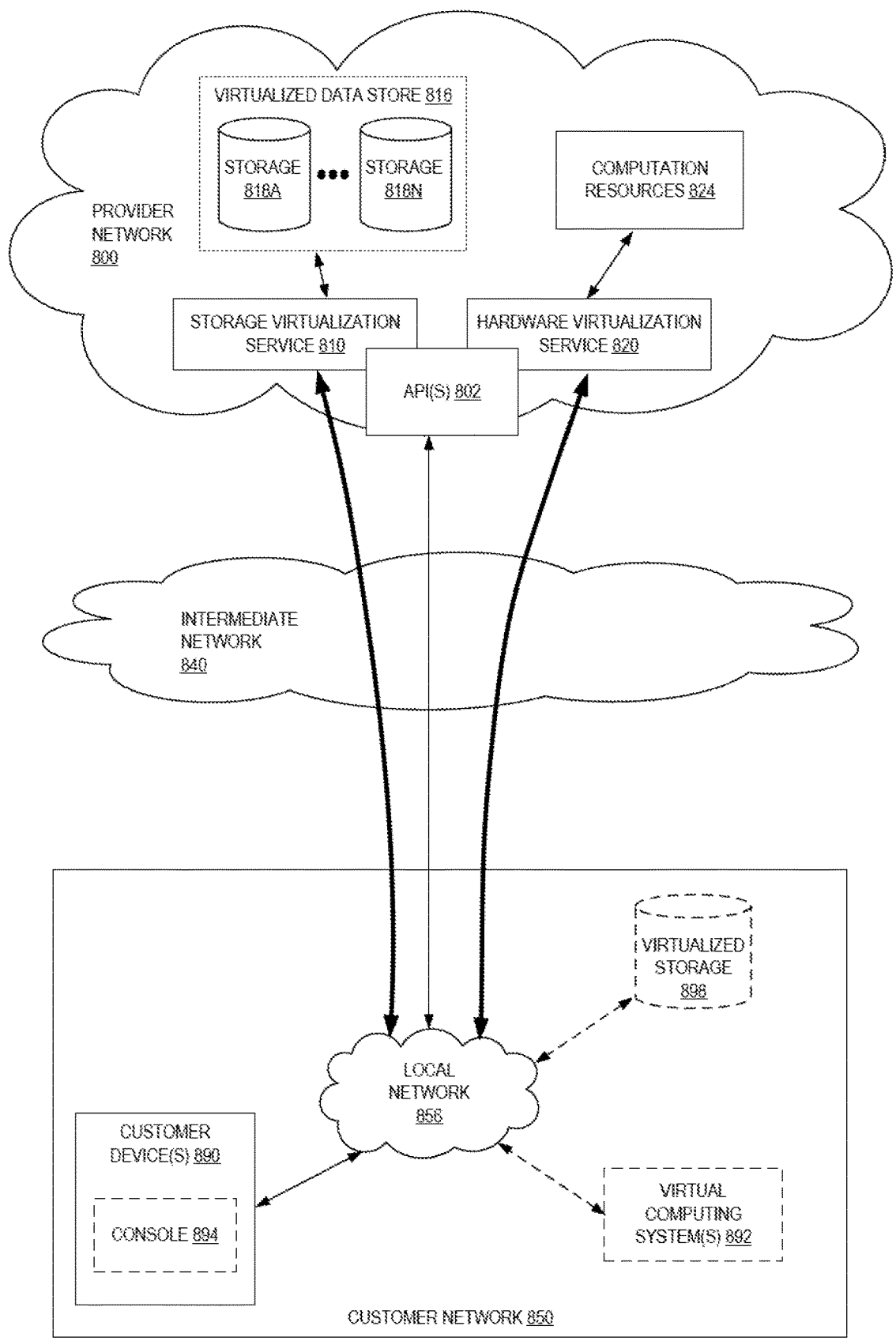
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
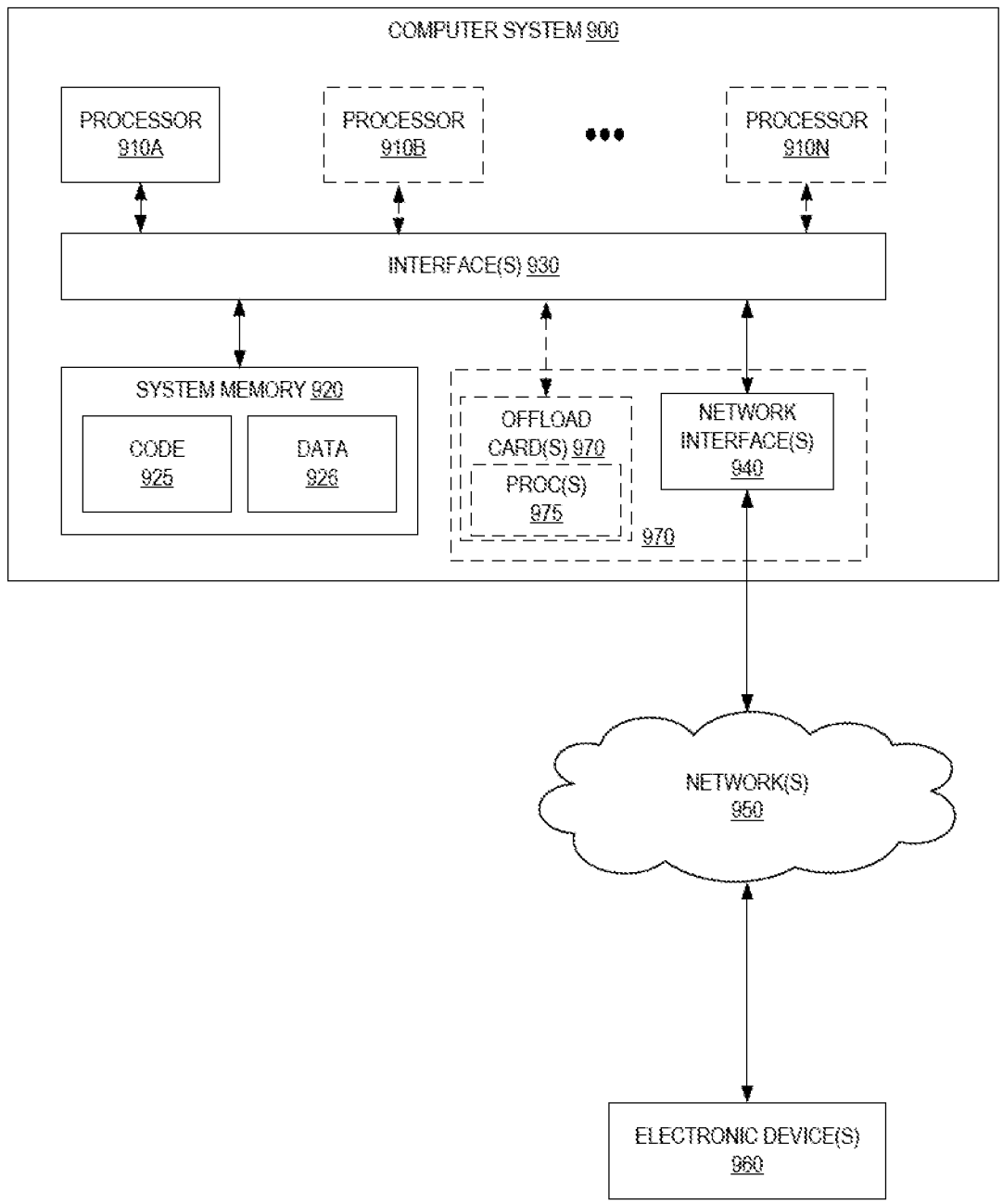
FIG. 9 is a block diagram illustrating an example computer system that may be used in some embodiments.

In some embodiments, a system that implements a portion or all of the techniques for content indexing as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In one embodiment, host groups comprised of multiple types of hardware should process each hardware type as an independent subgroup, with respect to the analysis by the anomaly detector. In these embodiments, hardware-dependent characteristics may generally result in different Fourier component values between such groups.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Figure 10:
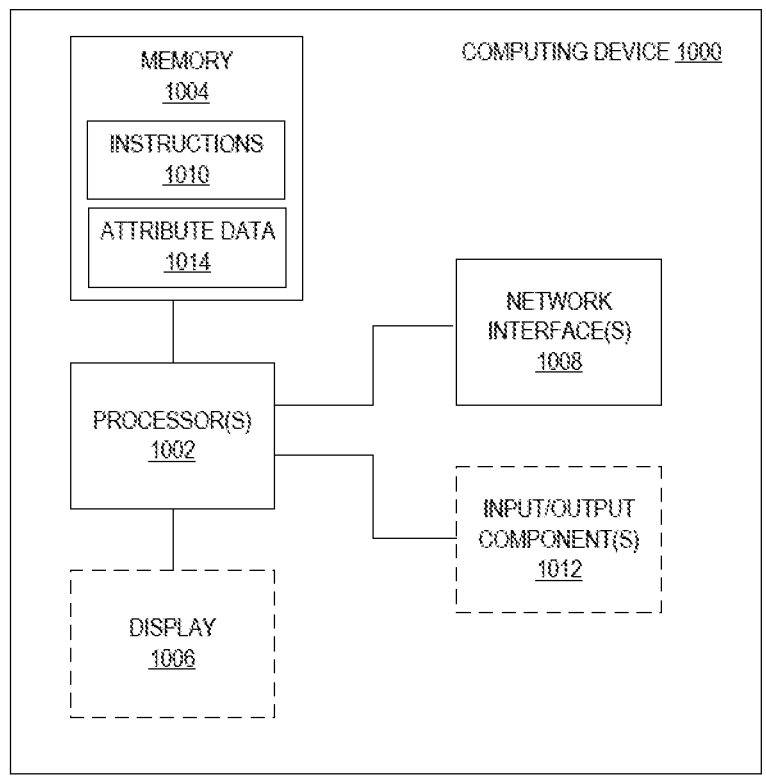
FIG. 10 illustrates a logical arrangement of a set of general components of an exemplary computing device that can be utilized in accordance with various embodiments.

FIG. 10 illustrates a logical arrangement of a set of general components of an example computing device 1000. Generally, a computing device 1000 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1002 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1004) to store code (for example, instructions 1010, e.g., which implement an anomaly detector as disclosed herein) and/or attribute data 1014 (e.g., generated by computing device 1000 for transmittal to an anomaly detector), and a set of one or more wired or wireless network interfaces 1008 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1004) of a given electronic device typically stores code (e.g., instructions 1010) for execution on the set of one or more processors 1002 of that electronic device. One or more parts of various embodiments may be implemented using different combinations of software, firmware, and/or hardware.

A computing device 1000 can include some type of display element 1006, such as a touch screen or liquid crystal display (LCD), although many devices such as portable media players might convey information via other means, such as through audio speakers, and other types of devices such as server end stations may not have a display element 1006 at all. As discussed, some computing devices used in some embodiments include at least one input and/or output component(s) 1012 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 11:
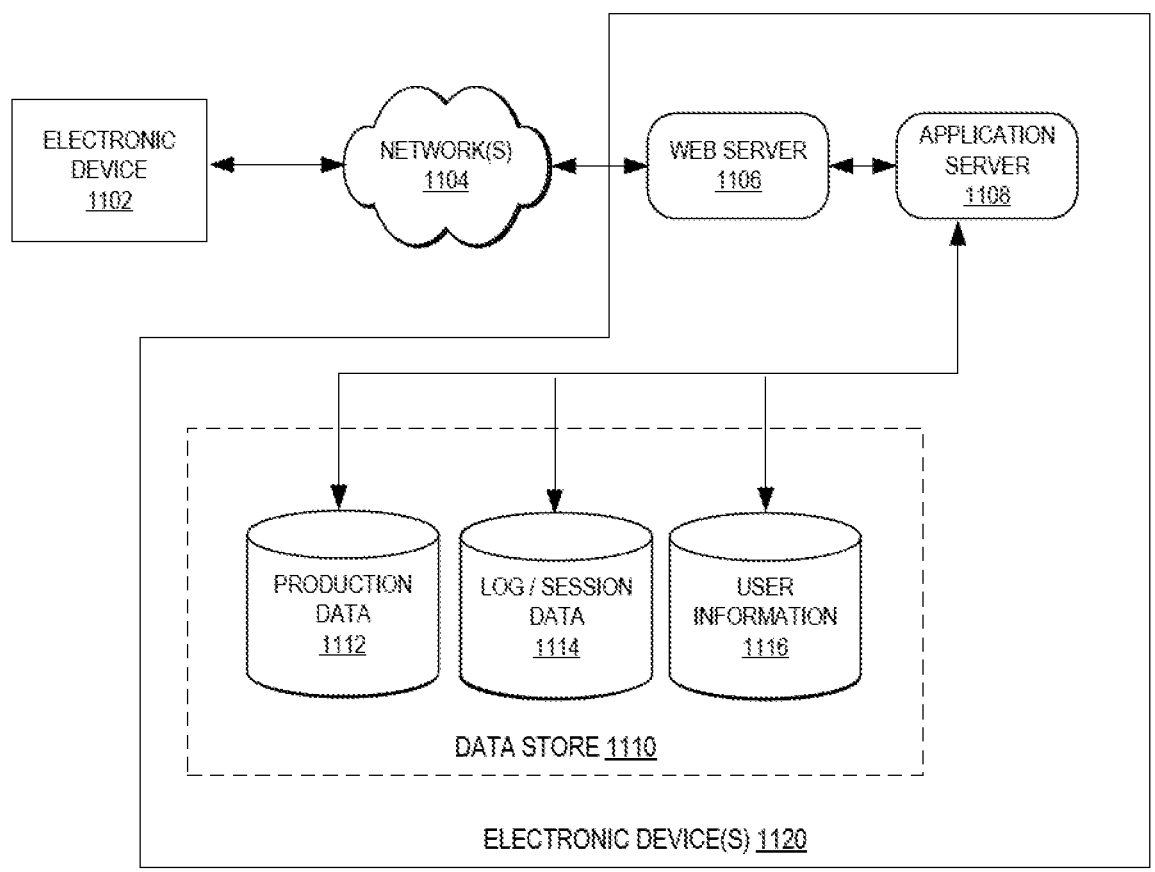
FIG. 11 illustrates an example of an environment for implementing aspects in accordance with various embodiments.

As discussed, different approaches can be implemented in various environments in accordance with the described embodiments. For example, FIG. 11 illustrates an example of an environment 1100 for implementing aspects in accordance with various embodiments. For example, in some embodiments messages are HyperText Transfer Protocol (HTTP) requests that are received by a web server (e.g., web server 1106), and the users, via electronic devices, may interact with the provider network via a web portal provided via the web server 1106 and application server 1108. As will be appreciated, although a web-based environment is used for purposes of explanation, different environments may be used, as appropriate, to implement various embodiments. The system includes an electronic client device 1102, which may also be referred to as a client device and can be any appropriate device operable to send and receive requests, messages or information over an appropriate network 1104 and convey information back to a user of the device 1102. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1104 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1104 includes the Internet, as the environment includes a web server 1106 for receiving requests and serving content in response thereto, although for other networks an alternative device serving a similar purpose could be used, as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1108 can include any appropriate hardware and software for integrating with the data store 1110 as needed to execute aspects of one or more applications for the client device 1102 and handling a majority of the data access and business logic for an application. The application server 1108 provides access control services in cooperation with the data store 1110 and is able to generate content such as text, graphics, audio, video, etc., to be transferred to the client device 1102, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1102 and the application server 1108, can be handled by the web server 1106. It should be understood that the web server 1106 and application server 1108 are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store 1110 also is shown to include a mechanism for storing log or session data 1114. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store 1110 might access the user information 1116 to verify the identity of the user and can access a production data 1112 to obtain information about items of that type. The information can then be returned to the user, such as in a listing of results on a web page that the user is able to view via a browser on the user device 1102. Information for a particular item of interest can be viewed in a dedicated page or window of the browser.

The web server 1106, application server 1108, and/or data store 1110 may be implemented by one or more electronic devices 1120, which can also be referred to as electronic server devices or server end stations, and may or may not be located in different geographic locations. Each of the one or more electronic devices 1120 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
performing a single, distributed task with a plurality of hosts;
sending, by each host of the plurality of hosts, processing utilization data for a period of time to an anomaly detector;
generating a Fourier component vector for each host that comprises a Fourier component value in each element from the processing utilization data of that host with the anomaly detector;
generating a mean value vector that comprises a mean value for each element position of the Fourier component vectors in a respective element position of the mean value vector with the anomaly detector;
generating a standard deviation vector that comprises a standard deviation for each element position of the Fourier component vectors in a respective element position of the standard deviation vector with the anomaly detector;
generating a host standard deviation vector for each host that comprises a deviation of each element of the Fourier component vector of that host from a respective element of the mean value vector by a number of standard deviations read from a respective element of the standard deviation vector with the anomaly detector;
determining, with the anomaly detector, an anomalous host of the plurality of hosts from the host standard deviation vectors when at least one threshold is exceeded in the host standard deviation vectors; and
causing an indication for the anomalous host to be sent by the anomaly detector.

2. The computer-implemented method of claim 1, wherein the at least one threshold comprises a first threshold for an element position of the host standard deviation vectors corresponding to a zeroth component of the Fourier component vectors, and a second, different threshold for another element position of the host standard deviation vectors.

3. The computer-implemented method of claim 1, wherein the indication for the anomalous host causes a display of a graph of the processing utilization data for the anomalous host and at least one other of the plurality of hosts.

4. A computer-implemented method comprising:
performing a distributed task with a plurality of hosts;
sending, by each host of the plurality of hosts, host attribute data for a period of time;
generating a Fourier component vector for each host that comprises a Fourier component value in each element from the host attribute data of that host;
generating a mean value vector that comprises a mean value for each element position of the Fourier component vectors in a respective element position of the mean value vector;
generating a standard deviation vector that comprises a standard deviation for each element position of the Fourier component vectors in a respective element position of the standard deviation vector;
generating a host standard deviation vector for each host that comprises a deviation of each element of the Fourier component vector of that host from a respective element of the mean value vector by a number of standard deviations read from a respective element of the standard deviation vector;
determining an anomalous host of the plurality of hosts from the host standard deviation vectors when at least one threshold is exceeded in the host standard deviation vectors; and
causing an indication for the anomalous host to be sent.

5. The computer-implemented method of claim 4, wherein the at least one threshold comprises a first threshold for an element position of the host standard deviation vectors corresponding to a zeroth component of the Fourier component vectors, and a second, different threshold for another element position of the host standard deviation vectors.

6. The computer-implemented method of claim 4, wherein the indication for the anomalous host causes a display of a graph of the host attribute data for the anomalous host and at least one other of the plurality of hosts.

7. The computer-implemented method of claim 4, wherein the at least one threshold comprises a threshold for an element position of the host standard deviation vectors corresponding to a zeroth component of the Fourier component vectors.

8. The computer-implemented method of claim 4, wherein the determining the anomalous host comprises determining that a plurality of elements of a host standard deviation vector for the anomalous host exceeds the at least one threshold.

9. The computer-implemented method of claim 4, wherein the plurality of hosts comprises at least three hosts.

10. The computer-implemented method of claim 4, wherein the host attribute data is processing utilization data.

11. The computer-implemented method of claim 4, wherein the host attribute data is latency data of the plurality of hosts.

12. The computer-implemented method of claim 4, wherein the indication is a uniform resource locator value sent to a user.

13. The computer-implemented method of claim 12, wherein the uniform resource locator value is for a graph of the host attribute data for the anomalous host and at least one other of the plurality of hosts.

14. The computer-implemented method of claim 4, further comprising replacing the anomalous host with a replacement host to perform a portion of the distributed task.

15. A non-transitory machine readable medium that stores code that when executed by a machine causes the machine to perform a method comprising:
performing a distributed task with a plurality of hosts;
sending, by each host of the plurality of hosts, host attribute data for a period of time;
generating a Fourier component vector for each host that comprises a Fourier component value in each element from the host attribute data of that host;
generating a mean value vector that comprises a mean value for each element position of the Fourier component vectors in a respective element position of the mean value vector;

generating a standard deviation vector that comprises a standard deviation for each element position of the Fourier component vectors in a respective element position of the standard deviation vector;

generating a host standard deviation vector for each host that comprises a deviation of each element of the Fourier component vector of that host from a respective element of the mean value vector by a number of standard deviations read from a respective element of the standard deviation vector;

determining an anomalous host of the plurality of hosts from the host standard deviation vectors when at least one threshold is exceeded in the host standard deviation vectors; and causing an indication for the anomalous host to be sent.

16. The non-transitory machine readable medium of claim 15, wherein the at least one threshold comprises a first threshold for an element position of the host standard deviation vectors corresponding to a zeroth component of the Fourier component vectors, and a second, different threshold for another element position of the host standard deviation vectors.

17. The non-transitory machine readable medium of claim 15, wherein the indication for the anomalous host causes a display of a graph of the host attribute data for the anomalous host and at least one other of the plurality of hosts.

18. The non-transitory machine readable medium of claim 15, wherein the at least one threshold comprises a threshold for an element position of the host standard deviation vectors corresponding to a zeroth component of the Fourier component vectors.

19. The non-transitory machine readable medium of claim 15, wherein the determining the anomalous host comprises determining that a plurality of elements of a host standard deviation vector for the anomalous host exceeds the at least one threshold.

20. The non-transitory machine readable medium of claim 15, wherein the indication is a uniform resource locator value sent to a user.

* * * * *